United States Patent Office 3,396,653
Patented Aug. 13, 1968

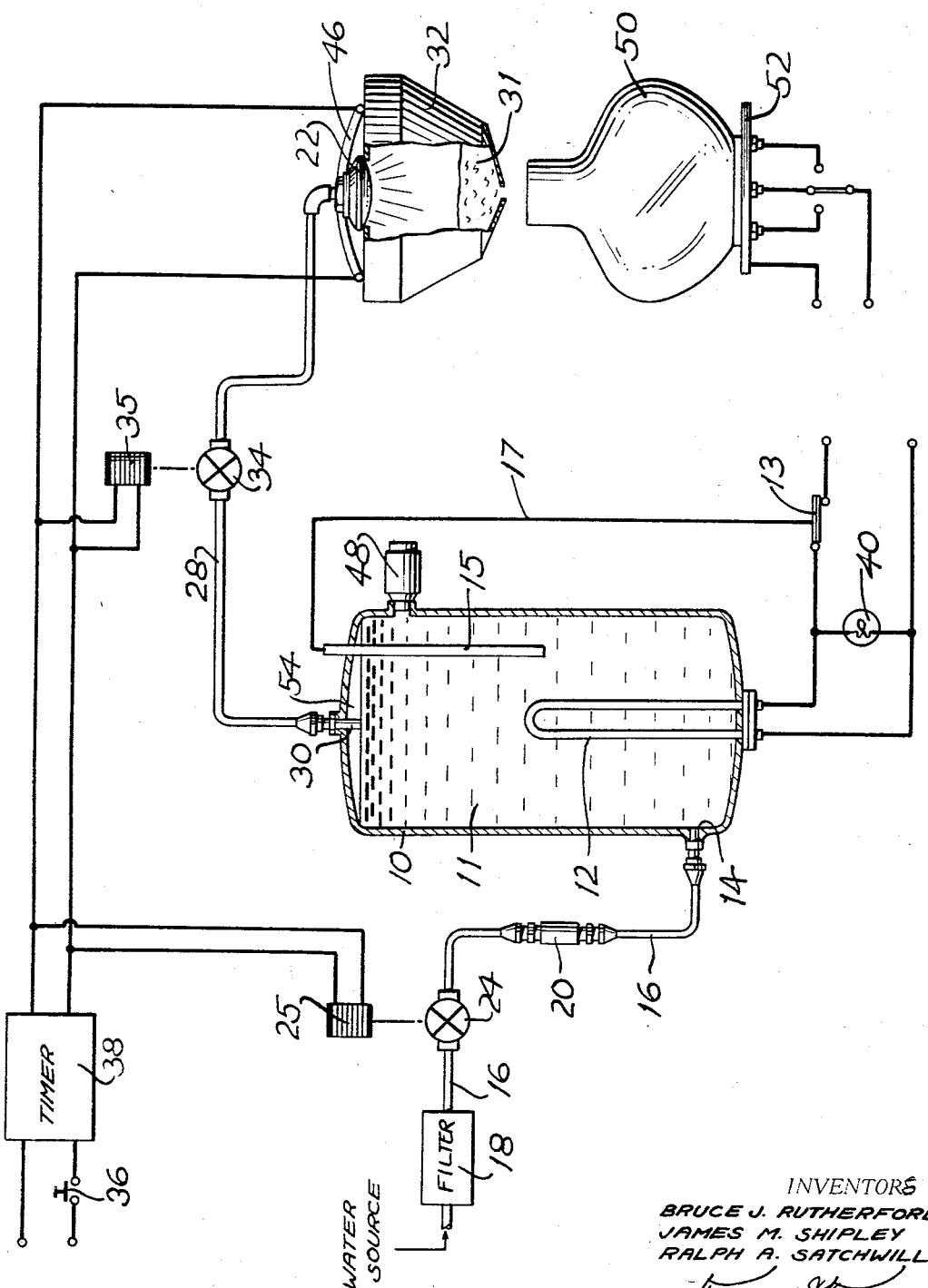

3,396,653
LIQUID HEATING APPARATUS
Bruce J. Rutherford, Long Beach, James M. Shipley, El Monte, and Ralph A. Satchwill, Lynwood, Calif., assignors to The Coca-Cola Company, Atlanta, Ga., a corporation of Delaware
Filed Feb. 2, 1967, Ser. No. 613,481
4 Claims. (Cl. 99—282)

ABSTRACT OF THE DISCLOSURE

The embodiment disclosed in the following specification is a coffee brewing apparatus employing an input gate valve and output gate valve arrangement for hydraulically isolating the liquid heating chamber during the heating portion of the cycle. The disclosure indicates how the opening of these two valves at the end of the heating portion of the cycle makes possible the dispensing of a controlled even flow of heated water at a predetermined temperature for brewing. A series of operational conditions for large coffee brewers are set forth and it is disclosed how this arrangement meets all these conditions.

This invention relates in general to an apparatus for the storing and heating of liquids and more particularly to such an apparatus as is adapted to provide an even flow of water at uniform temperature for such purposes as the brewing of roasted ground coffee.

In a large size commercial coffee brewing machine there are certain operational criteria which should, and in some cases must, be met. The following five criteria are among the more important operational goals in the design of a modern large scale commercial coffee brewing apparatus.

First, the high temperature water that is distributed over the bed of roasted ground coffee must be at a constant temperature. It is very undesirable for the initial flow of water to be at a temperature higher than the desired temperature and for the succeeding flow of water to be at a temperature substantially lower than the initial temperature. More specifically, if the water distributed over the ground coffee during a brewing cycle is not of a uniform temperature (195° F. to 202° F.) the resulting brew is not uniformly extracted and the result is a poor brew. Where the temperature is too high the brew is over extracted. When the temperature is too low the brew is under extracted. The resulting coffee has a less desirable flavor than a brew which is extracted at the uniform desired temperature or at least extracted at a temperature which stays within the 7° range indicated above. There are known devices which have a drop in temperature as much as 10° F. during the brewing cycle. In one embodiment, the brewer constructed in accordance with this invention had a drop of only 3° F. during the brewing cycle. Thus, both over extraction, due to initially excessive hot water, and/or under extraction due to water at too low a temperature during the final portion of the brewing cycle is eliminated by means of this invention. Generally, over extracted coffee is strong and bitter while under extracted coffee is weak and characterless.

Second, the water flow during the brewing cycle must be at a uniform rate. In brewing coffee, the coffee bed must first be covered with water and must then have the water supply added to so as to continue to flood and float the grounds. Too high a flow rate would overflow the cartridge and is clearly undesirable. Too slow a flow rate would allow grounds to settle and thus allow the escape of volatile oils into the atmosphere resulting in a weak and undeveloped brew. In addition, in those devices where the volume of water employed is a function of flow rate times a predetermined time period, the flow rate must be uniform (since the time is preset) in order to obtain the desired volume of water.

Third, it is desirable that the outlet or spray head not drip onto the coffee grounds during the heating portion of the cycle. Heating obviously must occur prior to the flow of water onto the coffee grounds. Dripping from the spray head during non-brewing periods results in the following: (a) if the cartridge contains used grounds, overextraction occurs and bitter ends can flow into decanter; (b) if the cartridge contains new grounds they would become moistened prior to brewing and this results in poorer extraction upon final usage, and (c) if no cartridge is present the drip floods the warmer element if the decanter has been removed or dilutes the prior brew if the decanter is in place.

Fourth, the apparatus must be safe from explosion or rupture under pressure. There have been occasional explosions from these types of devices presumably due to the fact that the pressure in the liquid chamber during heating rises to a point where the equipment is no longer able to contain the pressure developed.

Fifth, the heating and water dispensing cycle should be repeatable with consistent results as to water temperature, rate of flow and consequently quality of brewed coffee produced.

In brief, the water storage and heating apparatus of this invention achieves the above purposes and meets the design criterion listed, in one embodiment, by the addition of two solenoid operated gate valves, one at the input line to the storage and heating chamber and the other at the output line from the storage and heating chamber. More particularly, the input line gate valve is connected between the water inlet and the flow control valve, which flow control valve in turn is connected between this inlet gate valve and the inlet port to the water storage and heating chamber. The outlet gate valve is connected between the spray head and the outlet port at the top of the water storage and heating chamber.

These two gate valves are closed during the heating portion of the cycle and thus hydraulically isolate the contents of the storage and heating chamber from inlet and outlet pressures. As will be explained in greater detail in connection with the detailed description of this invention, the consequence of hydraulic isolation is that the total pressure within the storage and heating vessel is likely to be less with consequent decreased risk of rupture and/or explosion and thus decreased risk of injury to personnel or to equipment such as the flow control valve. Furthermore, this hydraulic isolation results in a more uniform heating of the water being held in the storage and heating chamber and, of course, also eliminates the problem of outlet drip prior to the operator controlled dispensing of the properly heated water onto the coffee grounds.

Accordingly, it is a major object of this invention to provide an improved coffee brewing system in which the water storage and heating apparatus meets all the above criteria without sacrificing one of the criteria in order to achieve another. The important aspect of this invention is in the achieving of a design in which all the above criteria are met.

It is a related purpose of this invention to achieve each of these criteria in a simple and relatively inexpensive fashion.

Accordingly, it is an important purpose of this invention to provide a single means for achieving all of the above purposes and criteria not only to minimize cost but to assure that one of the criteria is not sacrificed in order to meet the other design criteria.

Other objects and purposes of this invention will become apparent from the following detailed description and drawing in which the one figure shown is a hydraulic and electrical schematic of one embodiment of this invention.

With reference to the figure, the embodiment of this invention shown has a storage tank 10 in which water 11 is contained while it is being heated and prior to being dispensed. The heating element 12 in the tank 10 is connected through a thermostat switch 13 to a souce of electric power so that whatever water is in the tank 10 will be heated when the thermostat switch 13 is closed. A sensing element 15 is immersed in the water 11 and is connected to the thermostat switch 13 through a capillary tube 17. In this fashion the thermostat switch 13 is controlled by the temperature of the water 11.

An inlet port 14 at the bottom of the tank 10 is coupled to an inlet line 16 through which water is admitted to the tank 10. The front end of the line 16 is adapted to be connected to whatever source of city water or tap water is available. A filter 18 is normally included in the line 16 so as to assure the cleanliness of the water employed. A standard calibrated flow control valve 20 is incorporated in the inlet line 16 upstream from the inlet port 14. This flow control valve 20 is an important part of the apparatus shown since its calibration determines the rate at which water is dispensed from the spray head 22 after the heating portion of the cycle has been completed.

A first gate valve 24 is connected between the filter 18 and the flow control valve 20 so that when this gate valve 24 is closed the water in the tank 10 is hydraulically isolated from the local source of water. Thus whatever pressure may be supplied by the local source of water is not transmitted to the water in tank 10 when the gate valve 24 has been closed. As shown, the gate valve 24 is preferably controlled by a solenoid 25 so that the valve 24 is either entirely open or entirely closed. Thus the gate valve 24 differs from the more delicate flow control valve 20 which continuously adjusts from a completely open to a partially closed position, depending upon input pressure, so that the rate at which water is dispensed can be controlled.

An outlet line 28 is coupled to an outlet port 30 at the top of the water tank 10. The outlet line 28 terminates at a spray head 22 through which water is dispensed by being sprayed over a bed of roasted ground coffee 31 contained in the cartridge 32. A second gate valve 34, again controlled by a solenoid 35, is placed in the outlet line 28 between the outlet port 30 and the spray head 22. Thus when the second gate valve 34 is closed no water can be dispensed from the tank 10 which condition is essential during the heating portion of the cycle. Furthermore, the closing of the second gate valve 34 isolates whatever pressure is developed within the tank 10 from the atmospheric pressure. A spring loaded safety valve 48 is included as an additional safety feature.

A unique feature of this invention is the employment of the two gate valves 24 and 34, one on each side of the storage tank 10, so as to hydraulically isolate whatever water is in the storage tank 10 from water supply pressure and from atmospheric pressure. As a consequence, the various purposes of this invention are achieved and the criteria which define an optimum design for this type of apparatus are met. The fashion in which this hydraulic isolation achieves the purposes of this invention may be better understood after an understanding of the manner in which the apparatus is used during the heating and dispensing cycle.

In operation, the storage tank 10 has to be initially filled and, of course, this must be achieved by opening the two solenoid controlled gate valves 24 and 34. The operator actuates the start push button 36 which supplies power to the timer 38 and to the two solenoids 25 and 35. When energized the solenoids 25 and 35 open the gate valves 24 and 34 respectively so that water will flow into the tank 10. After a pre-set time period, the timer 38 opens the line so that the solenoids 25 and 35 are de-energized to close the valves 24 and 34 thereby hydraulically isolating the water in the tank 10 from water supply pressure as well as from atmospheric pressure. With the tank 10 full of cold water 11, the sensing element 15 causes the switch 13 to close thereby supplying power to the heating element 12.

Once the water in the tank 10 has been heated to the predetermined desired temperature, 202° F. for example, the thermostat switch 13 turns off power to the heating elements 12 and the glow lamp 40 goes out. The thermostat arrangement (sensing element 15, capillary tube 17 and switch 13) then operates to maintain the water in the tank 10 at the desired 202° F. temperature.

The dispensing switch, which is the start push button 36, is then operated by the operator to energize the solenoids 25 and 35 thereby opening the two gate valves 24 and 34.

The timing of the brewing portion of the operating cycle is controlled by the pre-set electric timer 38. After the glow lamp 40 has gone off, so that the operator knows the desired temperatures have been achieved, he may at any time press the dispensing switch 36 thereby starting the timer 38 running and supplying power to the solenoids 25 and 35 to open the two gate valves 24 and 34 respectively. The opening of these valves 24 and 34 causes water from the water supply to enter at the bottom of the tank 10 and force out the hot water through the spray head 22. In this fashion water is dispensed onto the coffee grounds 31.

The rate at which water is dispensed is constant and is controlled by the calibration of the flow control valve 20. The total amount of water which is dispensed is determined by the pre-set timer 38 that starts running at the same time as the two gate valves 24 and 34 are opened. After the predetermined time has passed a cam in the timer 38 opens the switch 36. Thus power is shut off from the solenoids 25 and 35 thereby closing the two gate valves 24 and 34 and terminating the hot water dispensing portion of the cycle.

The advent of cold water in the tank 10 then causes the thermostat arrangement to turn power on so that the heating elements 12 will bring up the temperature of the water in tank 10 to the predetermined desired value and thereby have water available for the next coffee brewing operation, when desired by the operator.

A condensation heater 46 is also turned on when the operator closes the dispensing switch and thereby starts the water dispensing cycle. The condensation heater 46 is placed at the top of the cartridge 32 that contains the coffee grounds and assures that whatever vapor rises from the cartridge 32 is kept from condensing on the cover plate of the cartridge and thereby prevents later weeping from the cover plate of the cartridge.

The brewed coffee drips into a decanter 50, under which a heating element 52 is placed to keep the brewed coffee warm until consumed.

In the above fashion, a constant cycle of (1) dispensing predetermined quantities of water at a predetermined rate and at a predetermined temperature followed by (2) heating of new water in the tank 10 is achieved. The cycle is initiated by the operator actuation of the dispensing switch which causes the dispensing portion of the cycle to be initiated. This dispensing portion of the cycle is automatically stopped by the timing mechanism in the timer 38 which closes the two gate valves 24 and 34. The water heating cycle stops, or more accurately, comes to a steady state condition with the going off of the glow lamp so as to indicate that the desired temperature has been attained. By operation of the thermostat this desired temperature is maintained.

With the above understanding of the apparatus and of its operation in mind, the manner in which the purposes of this invention are achieved can be readily and simply understood.

With reference to the five criteria that it is the main object of this invention to achieve in one simple coordinated fashion the following comments are directed.

There are situations where the water supply pressure fluctuates. If the water supply were left coupled hydraulically to the water in the tank 10 during heating, the pressure of the water in the tank 10 would also fluctuate. Apparently such water pressure fluctuations lead to heat variations in the temperature to which the water is heated. One of the reasons this may be true is that the temperature sensing bulb portion of the thermostat which is suspended within the water is not accurate under higher pressures. In any case, it has been found that hydraulically isolating the inlet water supply from the water in the tank 10 provides a more uniform temperature in the water available for dispensing at the spray head 22.

The desired uniformity of flow during the coffee brewing portion of the cycle is enhanced by eliminating a rather violent initial flow of water. The isolation of the water in the tank 10 during the heating cycle results in a lower pressure in the tank 10 at the end of the heating cycle. Thus when the gate valves 24 and 34 are opened the initial rush of water from the spray head 22 is much less violent and rapid than would otherwise be the case. Indeed, the initial flow of water from a high pressure tank can be so violent as to wash away coffee grounds and thus destroy the uniform, level brewing bed in the brewing cartridge 32 at the start of the cycle. The reduction in the tank pressure that is achieved by means of this invention has eliminated this particular problem.

Some pressure must be built up when water is heated. In the embodiment illustrated, the pressure that is attained is in the order of 30 p.s.i.g. The gate valve 34 in the output line 28 prevents the escape of liquid through the output line 28 under this pressure build up during heating. Thus the problem of liquid dripping from the spray head 22 during the heating portion of the cycle is eliminated. An expansion chamber (air chamber 54) is left at the top of the tank 10 to provide space for increased water volume as the water is heated.

A very important consequence of the hydraulic isolation of the water in the tank 10 during the heating portion of this cycle is that safety is greatly increased. The input water pressure is commonly between 80 and 120 p.s.i.g. The pressure from the expanding water in the vessel is in the order of 30 p.s.i.g. The sum of these two pressures causes a requirement for a high pressure vessel which is protected solely by a spring loaded safety valve and the ability of the input and output lines to withstand the pressure. As a consequence, previously designed devices of this general type have been known to explode and cause injury, particularly where a check valve is installed in the input line. The hydraulic isolation of the water in the tank 10 has substantially solved this problem.

The total water flow from the spray head 22, during the brewing portion of the cycle, is controlled in the device described herein as well as in many brewing devices by a combination of a flow control valve 20 and a timing mechanism 38. The flow control valves 20 can be designed to compensate for changes in input line pressures over a range of between 25 and 90 p.s.i.g. and to provide a constant flow rate independent of line pressures within these limits. However, these flow control valves will not accept high back pressures without some displacement or damage to the valve mechanism. By isolating the water in the tank 10 from the input line, with the gate valve 24, back flow through the flow control valve 20 and back pressure on the valve 20 is greatly reduced.

Hydraulic isolation of the water in the heating and storage tank 10 by means of two shut off or gate valves 24 and 34 is the structural means whereby the objects and purposes of this invention are achieved and a coffee brewing system meeting the criteria mentioned above may be designed. The reason as to why improved performance and operation is achieved has primarily to do with the fact that hydraulic isolation from the water supply line results in a lower pressure buildup within the tank 10 during the heating portion of the cycle. The 30 p.s.i.g. that may be developed when the water expands, as it is heated to 202° F., is not added to the 90 to 120 p.s.i.g. that may be imposed by the input water line. Because of the relatively lower pressure at the end of the heating cycle, (1) a safer device is provided, (2) more uniform flow, particularly at the beginning of the flow cycle, is achieved, (3) the temperature of the water dispensed is more uniform, (4) dripping from the spray head during the heating cycle is substantially eliminated and (5) the flow control valve, because it is not damaged by high pressure, operates more reliably and repeatably after many repeated operations.

Accordingly, it must be understood that this invention by means of a single fundamental feature, solves the design problem of meeting the seemingly disparate and possibly contradictory criteria. That fundamental feature is the hydraulic isolation of the water in the tank 10 during the heating cycle.

One embodiment of this invention has been described in considerable detail, in particular with regard to its application to the heating and dispensing of water for the brewing of roasted ground coffee. The invention is specifically applicable to solving the problem faced in the design of large size commercial coffee brewing systems. However, it should be understood that the device embodying this invention could be employed wherever a liquid containing vessel must be isolated from input line pressure except during flow portions of the cycle and where the flow from such a vessel must be accurately controlled during such flow portions.

Thus it should be understood that the following claims are intended to cover the basic inventive concepts and relationships and are not to be limited to one particular device.

What is claimed is:

1. In a water heating and storage apparatus adapted to supply heated water for such purposes as the brewing of roasted ground coffee, wherein the apparatus has (1) a heating and storage tank having an input line with a flow control valve connected into the input line and (2) an output line terminating in a spray head, the improvement comprising:

(A) a first gate valve connected into the input line at the input side of the flow control valve, and (B) a second gate valve connected into the output line between the tank and the spray head, whereby the closing of said first and said second gate valves at the start of a heating cycle will hydraulically isolate the contents of the tank from spray head and from whatever water line is coupled to the input side of said first gate valve, and whereby the opening of said first and said second gate valve at the end of the heating portion of the cycle will permit, by means of the flow control valve, the dispensing at the spray head of a controlled even flow of heated water at a predetermined temperature.

2. The water heating and storage apparatus of claim 1 further characterized by:

timing means for controlling the duration of a water dispersing cycle, and first and second solenoids coupled to said first and said second gate valve respectively to control the state of said valves, the energization of said solenoids being controlled by said timing means so that said gate valves are opened at the start of a hot water dispensing period and closed at the termination of the dispensing period.

3. The water heating and storage apparatus in claim 2 further characterized by:

heating means for heating whatever water is placed in said storage tank, and thermostat means for controlling the temperature to which the water in said tank is heated.

4. In a water heating and storage apparatus adapted to supply heated water for such purposes as the brewing of roasted ground coffee, wherein the apparatus has (1) a heating and storage tank having an input line with a flow control valve connected into the input line and (2) an output line terminating in a spray head, the improvement comprising:

(A) means for hydraulically isolating whatever water is in said tank during the period when said water is being heated, and (B) means for hydraulically coupling whatever water is in said tank to the input line and to the spray head during a hot water dispensing period.

References Cited

UNITED STATES PATENTS

| | | | |
|---|---|---|---|
| 2,761,200 | 9/1956 | Arnett | 99—283 |
| 2,839,988 | 6/1958 | Tritt | 99—282 X |
| 3,261,279 | 7/1966 | Kaplan et al. | 99—282 |

FOREIGN PATENTS 375,023  9/1939  Italy.

WILLIAM I. PRICE, *Primary Examiner.*